United States Patent Office 3,206,918
Patented Sept. 21, 1965

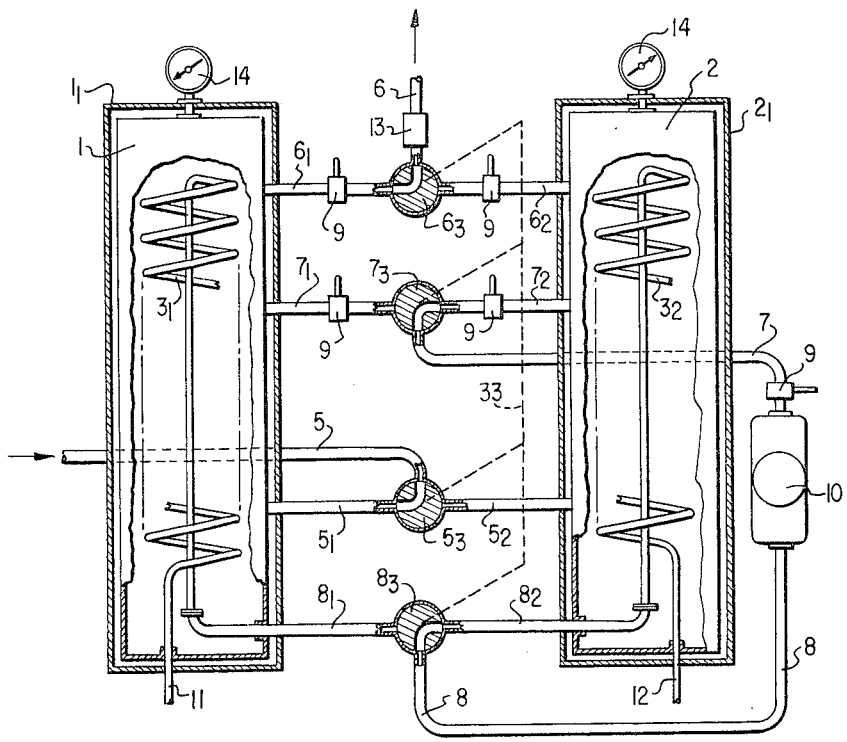

3,206,918
DESICCATORS FOR DRYING AIR OR OTHER GASES
Victor Snow Robinson, Croydon, Surrey, England, assignor to Lacy-Hulbert and Company Limited, Croydon, Surrey, England
Filed Oct. 4, 1962, Ser. No. 228,471
Claims priority, application Great Britain, Oct. 6, 1961, 36,030/61
6 Claims. (Cl. 55—179)

This invention relates to desiccators for air and other gases.

There is a common requirement in industry for a supply of compressed air or gas which is clean and substantially free of water vapour.

Known desiccators employing packs of such desiccants as silica gel or activated alumina are normally operated in pairs, so that one can be reactivated while the other is desiccating air or gas being passed through it.

Heating is normally carried out by electric heating elements, steam jackets or coils or by hot dry air or exhaust gases passed through a muffle. The heating must bring the desiccant above the boiling point of water and temperatures of the order of 400° to 500° F. are normal.

After reactivation the desiccant should be cooled to normal ambient temperature.

The provision of heating means, vapour purging air or gas flows is costly and the necessity to reach high temperature and later cool to ambient temperature is a time wasting factor in a reactivation process.

It is an object of the present invention to provide desiccators which can be reactivated more efficiently and at less cost than heretofore.

According to the invention I provide a desiccator for drying compressed gas of the kind employing a reactivated desiccant held in a container through which the gas is passed characterised by the provision of reactivating means for the desiccant comprising a vacuum pump connectible to the container to maintain a vacuum therein, the exhaust of the vacuum pump being discharged to atmosphere.

From another aspect the invention provides a desiccator for drying compressed gas comprising at least one pair of containers for desiccant and valves for interchanging the duty of the containers from desiccating to reactivation, a vacuum pump connectible at will to a container to be reactivated to maintain a vacuum thereon and a heating coil or jacket connectible to the exhaust of the vacuum pump for heating the desiccant.

The idea behind the invention is the realisation that a substantial reduction in pressure in a desiccant container with resultant lowering of the temperature of the vapour point of water absorbed by the desiccant makes possible reactivation at room temperature or the use of exhaust from a vacuum pump (at a temperature well above vapour point temperature) as a heat source for raising the water to an appropriate temperature value.

For example, lowering the pressure in a desiccant container to about two pounds per square inch absolute (25" to 26" Hg vacuum) means that absorbed water vaporizes at about 130° F., whereas the exhaust temperature of a pump maintaining such a vacuum could be at a temperature of about 200° F., and therefore capable of raising the water to the desired vapour point.

It will be appreciated that the vacuum pump exhaust will consist largely of water vapour and that having passed through a heating coil or jacket it can be freely discharged to atmosphere.

It will also be appreciated that the maintenance of vacuum in the desiccant container during a reactivation phase reduces temperature maxima and thus reduces the cooling period before the desiccant is again ready for use.

In an extreme case (which would probably call for the use of a two-stage pump) with a maintained vacuum of, say 29½ Hg complete reactivation of the desiccant can take place at room temperature; in such a case there is no necessity to use the pump exhaust as a heat source, though of course such utilisation will result in an accelerated process.

The invention further envisages the use of suitable valves ganged to a common operating spindle for not only changing the compressed gas path from one container to another of a pair but for changing simultaneously the inlet and exhaust connections of an associated vacuum pump.

A typical installation of one pair of desiccant containers calls for the use of four ganged three way valves. These valves have the following functions: (a) Change over of compressed gas inlet from one container to the other (b) change over of compressed gas outlet from one container to the other (c) change over of vacuum pump inlet from one container to the other (d) change over of vacuum pump exhaust from the heating coil or jacket of one container to the other.

The choice of the degree of vacuum to be maintained in a desiccant container (dependent upon the sort of pump employed and its power consumption) is related to the permissible water vapour content of the compressed gas which varies between very wide limits. As much as one and a half grains of water vapour per pound of air is acceptable in wind tunnels, while only five hundredths of a grain can be permitted in altitude test chambers.

The above and other features are embodied in two preferred forms of the invention which will now be described by way of example, with reference to the accompanying drawings in which FIG. 1 is an elevation with parts in section and diagrammatically showing a common spindle for controlling simultaneously all four valves of one form of desiccator.

FIG. 2 is an elevation of a simpler form of desiccator.

The desiccator shown in FIG. 1 for drying compressed gas comprises a pair of cylinders 1 and 2 containing a reactivatable desiccant such as silica gel or activated alumina. Each cylinder contains a heating coil $3_1$ and $3_2$ running the length of the cylinder and symmetrically placed within the cylinder.

There are effectively four connections to be made to each cylinder, an input for wet air 5, $5_1$, $5_2$ and output for dry air 6, $6_1$, $6_2$, a vacuum attachment 7, $7_1$, $7_2$, and a heat input 8, $8_1$, $8_2$, to the heating coils $3_1$ and $3_2$.

Since only one cylinder is to operate at a time, the other being reactivated, the connections are made through four common three way cocks $5_3$, $6_3$, $7_3$, and $8_3$ ganged for simultaneous operation to the common spindle 33. Filters 9 are incorporated in the dry air outlet pipe $6_1$, $6_2$, and the evacuating pipes 7, $7_1$, $7_2$ of each cylinder.

One port of the cock $7_3$ is connected to a suitable vacuum pump 10 whose exhaust is connected through the pipe 8 to the three way heat input cock $8_3$ to one or other of the coils $3_1$ and $3_2$.

These coils $3_1$ and $3_2$ are isolated from the interior of the cylinders 1 and 2 as far as air flow is concerned and they discharge to atmosphere at 11 and 12.

The dry air outlets $6_1$ and $6_2$ of the cylinders 1 and 2 are connected to the ports of the three way cock $6_3$ and a humidity detector 13 is connected in the common dry air outlet pipe 6.

An absolute pressure gauge 14 is fitted to each cylinder 1 and 2.

In operation, the cocks are arranged so that heat and vacuum are connected to one cylinder 2 to reactivate the desiccant contained therein while compressed gas is passed through the other cylinder 1 to desiccate it.

Change over is effected manually and simultaneously when the humidity detector 13 indicates the desiccant in use in cylinder 1 has reached an unacceptable saturation level.

The effectiveness of this system can be gauged from the following sample figures which are for water.

| Vacuum, inches Hg | Absolute pressure, lbs. per sq. in. | Temperature of vapour point, °F. |
|---|---|---|
| 24″ | 2.918 | 140 |
| 25″ | 2.427 | 133 |
| 26″ | 1.926 | 125 |
| 27″ | 1.43 | 114 |
| 28″ | .94 | 100.5 |
| 29″ | .485 | 79 |
| 29½″ | .231 | 57 |

A small rotary vacuum pump would produce a vacuum of 25/26″ and a single stage reciprocating type of vacuum pump would produce a vacuum from 26″ up to 28½″ Hg. Above this it would be necessary to employ a 2 stage vacuum pump which would produce a vacuum up to 29½″ Hg and at this degree of vacuum the vapour point is as low as 57° F.

Thus it will be seen that the temperature of the exhaust of a simple pump will normally be sufficient to vaporize water in the vacuum conditions that such a pump can produce.

With a two stage pump, room temperature may well be all that is required to cause water to vaporize.

If this is so, then it should prove to be more economical to use one or more of the simpler forms of desiccator shown in FIG. 2.

This form of desiccator comprises a vertical cylinder 21 containing reactivatable desiccant, with an inlet 22 for compressed air to be desiccated including a shut off valve 23 at one end and, at the other end, a dry air outlet 24 including a filter 25 and a humidity detector 26 and an evacuating outlet 27 including a filter 28 and a two stage vacuum pump 29 discharging to atmosphere. An absolute pressure gauge 30 is connected to the cylinder 21, and a valve 31 is provided to close the dry air outlet 24.

When the humidity detector indicates that the desiccant requires reactivating, the valves 23 and 31 are closed and the vacuum pump 29 is operated, discharging its exhaust gas to atmosphere.

In either system there is no need to have a dry air supply for purging the desiccant as vapours produced are removed by the vacuum pump.

It also follows that less time will be required for the desiccant to cool after reactivation as it will not have been heated to the 400° or 500° F. that is normal in other systems.

Also less heat will be applied to the coils $3_1$ and $3_2$ automatically as the vacuum in the cylinders increases, further decreasing the cooling time required.

In order to prevent heat losses by convection through the cylinder walls it is found expedient to surround them with jackets $1_1$, $2_1$ and to evacuate the space between the jackets and the cylinders so that the desiccant is, in effect, contained in a sort of vacuum flask. The construction for evacuation of the double-walled container is conventional and has not been indicated in the drawings.

It will be understood that the invention is not restricted to the details of the specific embodiment described which may be varied without departing from the scope of the following claims.

I claim:
1. A desiccator for drying a compressed gas, comprising a container having an inlet and an outlet for compressed gas, means for closing said inlet and outlet, a reactivatable desiccant held in said container and through which a compressed gas is to be passed for drying, and reactivating means for the desiccant including a vacuum pump, a vacuum line having a valve connecting said pump to said container to maintain a vacuum therein upon opening of said valve and closing of said inlet and outlet means, and a duct connecting the exhaust of the vacuum pump to atmosphere and arranged in heat exchange relation to the desiccant in said container so that exhaust gas from the vacuum pump indirectly heats the desiccant when the pump is operated.

2. A desiccator for drying compressed gas comprising a pair of containers each containing a desiccant and having an inlet and an outlet for compressed gas, first and second duct and valve means interconnecting the inlets and outlets respectively and operative to switch a compressed gas to pass through one container instead of the other, a vacuum pump, vacuum lines including a third valve means interchangeably connecting said vacuum pump at will to either one of said containers in which the desiccant is to be reactivated, and a pair of heating coils in heat exchange relation to the desiccants in said containers connected through a fourth valve means to the exhaust of the vacuum pump and discharging to atmosphere.

3. A desiccator according to claim 2 in which said first, second, third and fourth valve means are ganged to a common operating spindle for not only changing the path of compressed gas from one container to the other but for changing simultaneously the connections of said vacuum pump.

4. A desiccator according to claim 2 wherein a common operating means is provided for simultaneously operating said first, second, third and fourth valve means to direct compressed gas from the inlet of one container to the other, divert passage of dried compressed gas from the outlet of one container to the other, change over of the vacuum pump connection from the vacuum line of one container to the other, and change over connection of vacuum pump exhaust from the heating coil of one container to the other.

5. A desiccator according to claim 1 in which the desiccant container is surrounded by an evacuated jacket to obviate heat losses.

6. A desiccator according to claim 2 in which the containers are each surrounded by an evacuated jacket to obviate heat losses.

References Cited by the Examiner
UNITED STATES PATENTS

| 1,145,579 | 7/15 | Garner | 55—28 |
| 1,906,917 | 5/33 | Peters et al. | 55—28 |
| 1,934,075 | 11/35 | Lewis | 55—179 X |
| 2,254,799 | 9/41 | Erdmann | 55—25 |
| 2,699,837 | 1/55 | Van Note | 55—179 |
| 2,747,681 | 5/56 | Schuftan et al. | 55—180 |
| 3,016,978 | 1/62 | Hull | 55—179 |

REUBEN FRIEDMAN, *Primary Examiner.*